US011136644B2

(12) United States Patent
Obata et al.

(10) Patent No.: US 11,136,644 B2
(45) Date of Patent: Oct. 5, 2021

(54) HIGH-STRENGTH COLD ROLLED STEEL SHEET AND METHOD FOR PRODUCING THE SAME

(71) Applicant: JFE STEEL CORPORATION, Tokyo (JP)

(72) Inventors: Yoshie Obata, Tokyo (JP); Katsutoshi Takashima, Toyko (JP); Takashi Kobayashi, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/325,299

(22) PCT Filed: Aug. 29, 2017

(86) PCT No.: PCT/JP2017/030849
§ 371 (c)(1),
(2) Date: Feb. 13, 2019

(87) PCT Pub. No.: WO2018/043456
PCT Pub. Date: Mar. 8, 2018

(65) Prior Publication Data
US 2019/0203315 A1    Jul. 4, 2019

(30) Foreign Application Priority Data

Aug. 31, 2016  (JP) ............................. JP2016-168905

(51) Int. Cl.
*C21D 9/46* (2006.01)
*C21D 8/02* (2006.01)
*C21D 6/00* (2006.01)
*C22C 38/38* (2006.01)
*C22C 38/32* (2006.01)
*C22C 38/28* (2006.01)
*C22C 38/26* (2006.01)
*C22C 38/16* (2006.01)
*C22C 38/14* (2006.01)
*C22C 38/12* (2006.01)
(Continued)

(52) U.S. Cl.
CPC .............. *C21D 9/46* (2013.01); *B32B 15/013* (2013.01); *C21D 1/18* (2013.01); *C21D 1/25* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C21D 8/0405* (2013.01); *C21D 8/0426* (2013.01); *C21D 8/0436* (2013.01); *C21D 8/0463* (2013.01); *C21D 8/0473* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/26* (2013.01); *C22C 38/28* (2013.01); *C22C 38/32* (2013.01); *C22C 38/38* (2013.01); *C22C 38/60* (2013.01); *C23C 2/06* (2013.01); *C23C 2/28* (2013.01); *C23C 2/40* (2013.01); *C23F 17/00* (2013.01); *C21D 2211/001* (2013.01); *C21D 2211/002* (2013.01); *C21D 2211/005* (2013.01); *C21D 2211/008* (2013.01); *C22C 18/04* (2013.01); *C25D 3/22* (2013.01)

(58) Field of Classification Search
None
See application file for complete search history.

(56) References Cited

U.S. PATENT DOCUMENTS 5,628,044 A * 5/1997 Cook ...................... C21D 6/00
   419/3
8,876,987 B2 * 11/2014 Matsuda ................ C22C 38/12
   148/320

(Continued)

FOREIGN PATENT DOCUMENTS

CN    102011053 A    4/2011
EP    2309012 A1    4/2011

(Continued)

OTHER PUBLICATIONS

Oct. 24, 2017 International Search Report issued in International Application No. PCT/JP2017/030849.

(Continued)

Primary Examiner — Anthony M Liang
(74) Attorney, Agent, or Firm — Oliff PLC

(57) ABSTRACT

A high-strength cold rolled steel sheet having a specified chemical composition and a method for producing the same. The steel sheet having a microstructure including, in terms of volume fraction, 35% or less of ferrite, 1% or more and 10% or less of retained austenite, 2% or more and 12% or less of as-quenched martensite, and a total of 25% to 70% of bainite and tempered martensite. The microstructure has an average crystal grain diameter of the ferrite: 5.0 µm or less, an average crystal grain diameter of the retained austenite: 2.0 µm or less, an average crystal grain diameter of the as-quenched martensite: 3.0 µm or less, an average crystal grain diameter of the bainite and the tempered martensite phase: 4.0 µm or less, and an average intergrain distance of the as-quenched martensite of 1.0 µm or more.

8 Claims, No Drawings

(51) Int. Cl.

| | |
|---|---|
| *C22C 38/08* | (2006.01) |
| *C22C 38/06* | (2006.01) |
| *C22C 38/04* | (2006.01) |
| *C22C 38/02* | (2006.01) |
| *C22C 38/00* | (2006.01) |
| *C23F 17/00* | (2006.01) |
| *B32B 15/01* | (2006.01) |
| *C23C 2/06* | (2006.01) |
| *C22C 38/60* | (2006.01) |
| *C21D 8/04* | (2006.01) |
| *C22C 38/18* | (2006.01) |
| *C23C 2/28* | (2006.01) |
| *C23C 2/40* | (2006.01) |
| *C21D 1/18* | (2006.01) |
| *C21D 1/25* | (2006.01) |
| *C22C 18/04* | (2006.01) |
| *C25D 3/22* | (2006.01) |

(56) References Cited

U.S. PATENT DOCUMENTS

| | | | |
|---|---|---|---|
| 10,156,005 B2 * | 12/2018 | Takashima | C21D 8/0463 |
| 2008/0000555 A1 | 1/2008 | Nonaka et al. | |
| 2011/0008647 A1 | 1/2011 | Azuma et al. | |
| 2011/0146852 A1 | 6/2011 | Matsuda et al. | |
| 2011/0162762 A1 | 7/2011 | Matsuda et al. | |
| 2012/0118438 A1 | 5/2012 | Nakagaito et al. | |
| 2013/0008568 A1 | 1/2013 | Suwa et al. | |
| 2013/0048161 A1 | 2/2013 | Matsuda et al. | |
| 2013/0133786 A1 | 5/2013 | Matsuda et al. | |
| 2013/0133792 A1 | 5/2013 | Nakagaito et al. | |
| 2014/0096876 A1 | 4/2014 | Matsuda et al. | |
| 2014/0342184 A1 | 11/2014 | Takagi et al. | |
| 2016/0168656 A1 | 6/2016 | Kawabe et al. | |
| 2016/0177427 A1 * | 6/2016 | Takashima | C21D 8/0263 |
| | | | 148/603 |
| 2017/0107591 A1 | 4/2017 | Takashima et al. | |

FOREIGN PATENT DOCUMENTS

| | | |
|---|---|---|
| EP | 2426230 A1 | 3/2012 |
| EP | 3012339 A1 | 4/2016 |
| JP | H8-283838 A | 10/1996 |
| JP | 2005105367 A | 4/2005 |
| JP | 3758515 B2 | 3/2006 |
| JP | 2010-059452 A | 3/2010 |
| JP | 2011-001579 A | 1/2011 |
| JP | 2011-149066 A | 8/2011 |
| JP | 2011-195956 A | 10/2011 |
| JP | 4925611 B2 | 5/2012 |
| WO | 2014/061270 A1 | 4/2014 |
| WO | 2015/151427 A1 | 10/2015 |

OTHER PUBLICATIONS

May 17, 2019 Extended Search Report issued in European Patent Application No. 17846461.6.
Jan. 12, 2018 Office Action issued in U.S. Appl. No. 14/911,088.
Jul. 11, 2014 Notice of Allowance issued in U.S. Appl. No. 14/349,234.
Jun. 5, 2018 Office Action issued in U.S. Appl. No. 14/911,088.
May 29, 2020 Office Action issued in Chinese Patent Application No. 201780049503.X.
May 8, 2020 Office Action issued in Korean Patent Application No. 10-2019-7004127.

* cited by examiner

HIGH-STRENGTH COLD ROLLED STEEL SHEET AND METHOD FOR PRODUCING THE SAME

TECHNICAL FIELD

This application relates to a high-strength cold rolled steel sheet having a tensile strength (TS) of 980 MPa or more suitable for use in automobile parts.

BACKGROUND

In the field of automobiles, thickness reduction of automobile parts by using high-strength steel sheets is promoted in order to reduce the weight of car bodies to thereby improve fuel efficiency, and high-strength steel sheets having a tensile strength (TS) of 980 MPa or more are increasingly used. Steel sheets for automobile structural elements and reinforcing elements are required to excel in formability and, for forming parts with complicated shapes, both high ductility and stretch flangeability (hole expandability) are required. Moreover, since automobile parts are joined together mainly by resistance welding (spot welding), excellent resistance weldability (weldability) is also required.

As a high-strength cold rolled steel sheet with excellent formability, a DP steel sheet having a dual phase composed of soft ferrite and hard martensite is known. For example, Patent Literature 1 discloses a high-strength steel sheet having excellent ductility and a maximum tensile strength of 900 MPa or more, the high-strength steel sheet having a composition containing, in terms of mass %, C: 0.07 to 0.25%, Si: 0.3 to 2.50%, Mn: 1.5 to 3.0%, Ti: 0.005 to 0.09%, B: 0.0001 to 0.01%, P: 0.001 to 0.03%, S: 0.0001 to 0.01%, Al: 2.5% or less, N: 0.0005 to 0.0100%, O: 0.0005 to 0.007%, and the balance being Fe and unavoidable impurities, in which the steel microstructure includes a volume fraction of 50% or more of ferrite and martensite having a block size of 1 µm or less, and the C concentration in the martensite is 0.3% to 0.9%. However, the DP steel sheet has a problem in that martensite having high hardness is present in the steel sheet microstructure, and thus, voids occur at the interface between martensite and soft ferrite when punching is conducted, and hole expandability is degraded.

Furthermore, a TRIP steel sheet containing retained austenite is known as a steel sheet that has both high ductility and high strength. Since retained austenite undergoes work-induced transformation to martensite during deformation, high strength and high ductility can both be achieved. However, the TRIP steel sheet also has a problem in that retained austenite transforms into martensite when punching is conducted, and thus, voids are likely to occur at the interface between martensite and soft ferrite, and hole expandability is degraded. To address this issue, Patent Literature 2 discloses a high-strength steel sheet having excellent elongation and hole expandability, the high-strength steel sheet having a composition containing, in terms of mass %, C: 0.05 to 0.35%, Si: 0.05 to 2.0%, Mn: 0.8 to 3.0%, P: 0.0010 to 0.1%, S: 0.0005 to 0.05%, N: 0.0010 to 0.010%, Al: 0.01 to 2.0%, and the balance being Fe and unavoidable impurities, in which a steel microstructure is mainly composed of ferrite, bainite, or tempered martensite and contains 3% or more and 30% or less of a retained austenite phase, and in which 50% or more of retained austenite grains that satisfy $C_{gb}/C_{gc} > 1.3$, where $C_{gc}$ represents the center concentration of the retained austenite phase and $C_{gb}$ represents the grain boundary concentration of the retained austenite grains, are contained so as to enhance the stability of the retained austenite phase interface.

Furthermore, in addition to having steel sheet formability, high-strength cold rolled steel sheets are required not to crack during welding in order to obtain excellent joint strength during resistance welding. However, as the strength of the steel sheets increases, particularly in galvanized steel sheets, zinc on the steel sheet surface melts during resistance welding, and tensile stress occurs near the weld, sometimes resulting in liquid metal embrittlement and cracking in the steel sheets. To address this issue, Patent Literature 3 discloses a high-tensile galvanized steel sheet having excellent surface cracking resistance during resistance welding, the high-tensile galvanized steel sheet having a composition containing, in terms of mass %, C: 0.015 to 0.072%, Si: 1.2% or less, Mn: 0.5 to 3.0% or less, P: 0.020% or less, S: 0.030% or less, sol. Al: 0.002 to 1.20%, provided that Si+sol.Al+0.4×Mn≤1.4%, and the balance being Fe and unavoidable impurities, and being obtained by galvanizing a steel sheet having a tensile strength of 450 MPa or more.

CITATION LIST

Patent Literature

PTL 1: Japanese Patent No. 4925611
PTL 2: Japanese Unexamined Patent Application Publication No. 2011-195956
PTL 3: Japanese Patent No. 3758515

SUMMARY

Technical Problem

Addition of C, Si, Mn, etc., is necessary in order for a high-strength cold rolled steel sheet to have high ductility and hole expandability; however, increasing the contents of these elements poses an issue of degradation of resistance weldability. The steel sheet disclosed in Patent Literature 1 intentionally uses Si in order to obtain 50% or more of ferrite and martensite having a C concentration of 0.3% to 0.9%; however, hole expandability and weldability are not taken into account.

Moreover, the high-strength steel sheet disclosed in Patent Literature 2 also does not take weldability into account although large quantities of C and Si are added to obtain retained austenite.

In resistance welding (spot welding), in general, a steel sheet contacts the electrode in a perpendicular manner; however, during automobile parts assembly, the steel sheet or the electrode may become tilted depending on the welding position, and the angle between the steel sheet and the electrode may deviate from the right angle (deviation in spot-weld angle). In such a case, the stress load applied to the steel sheet during welding becomes uneven, and cracking is prone to occur at positions under high load. However, the steel sheet disclosed in PTL 3 does not take into account the weld crack in the case of deviation in spot-weld angle, or the hole expandability.

An object of the disclosed embodiments is to advantageously solve the problems of the related art and to provide a high-strength cold rolled steel sheet having a tensile strength of 980 MPa or more, high ductility, high hole expandability, and excellent resistance weldability, and a method for producing the same.

Technical Solution

The inventors conducted extensive studies to obtain a high-strength cold rolled steel sheet that has a tensile strength (TS) of 980 MPa or more, excellent ductility and hole expandability, and excellent weldability, and a method for producing the same. As a result, the inventors found that a high-strength cold rolled steel sheet having excellent ductility and hole expandability and excellent weldability with lower C and Si contents can be obtained by forming fine ferrite, retained austenite, martensite (as-quenched martensite), bainite, and tempered martensite and by controlling the intergrain distance of martensite (as-quenched martensite). In this description, a simple reference, "martensite", means as-quenched martensite.

In a hole expanding test, voids that occur at the interface between a soft phase and a hard phase grow and connect to form cracks. Thus, in order to obtain high hole-expandability, it is necessary to suppress occurrence of voids and suppress growth and connecting of the voids. Thus, the inventors conducted studies to fulfil these requirements. As a result of studies, the inventors found a range in which the hole expandability is improved by adjusting the volume fractions and the average crystal grain diameters of the soft phase and the hard phase and additionally controlling the intergrain distance of martensite, which constitutes the hard phase.

In order to obtain a steel microstructure of an appropriate morphology, for a steel containing particular amounts of Ti and Nb, the cooling stop temperature after hot rolling is controlled, cold rolling is performed within appropriate condition ranges, and annealing conditions are appropriately controlled. As a result, it has become possible to obtain a final steel microstructure including finer crystal grains of ferrite, retained austenite, martensite, bainite, and tempered martensite. Moreover, it has become possible to control the intergrain distance of martensite, and it has been found that a high-strength cold rolled steel sheet having a tensile strength of 980 MPa or more, excellent ductility and hole expandability, and excellent weldability can be obtained while suppressing the amounts of C and Si added.

The disclosed embodiments have been made on the basis of the above-described findings and has the following features.

[1] A high-strength cold rolled steel sheet having a composition containing, in terms of mass %, C: 0.04% or more and 0.12% or less, Si: 0.15% or more and 0.95% or less, Mn: 2.00% or more and 3.50% or less, P: 0.050% or less, S: 0.0050% or less, N: 0.0100% or less, Al: 0.010% or more and 2.0% or less, Ti: 0.005% or more and 0.075% or less, Nb: 0.005% or more and 0.075% or less, B: 0.0002% or more and 0.0040% or less, and the balance being Fe and unavoidable impurities; and a steel microstructure including, in terms of volume fraction, 35% or less of ferrite, 1% or more and 10% or less of retained austenite, 2% or more and 12% or less of as-quenched martensite, and a total of 25% to 70% of bainite and tempered martensite. The steel microstructure satisfies: an average crystal grain diameter of the ferrite: 5.0 μm or less, an average crystal grain diameter of the retained austenite: 2.0 μm or less, an average crystal grain diameter of the as-quenched martensite: 3.0 μm or less, an average crystal grain diameter of the bainite and the tempered martensite phase: 4.0 μm or less, and an average intergrain distance of the as-quenched martensite of 1.0 μm or more.

[2] The high-strength cold rolled steel sheet described in [1], wherein the composition further contains, in terms of mass %, at least one element selected from V: 0.005% or more and 0.200% or less, Cr: 0.05% or more and 0.20% or less, Mo: 0.01% or more and 0.20% or less, Cu: 0.05% or more and 0.20% or less, Ni: 0.01% or more and 0.20% or less, Sb: 0.002% or more and 0.100% or less, Sn: 0.002% or more and 0.100% or less, Ca: 0.0005% or more and 0.0050% or less, Mg: 0.0005% or more and 0.0050% or less, and REM: 0.0005% or more and 0.0050% or less.

[3] The high-strength cold rolled steel sheet described in [1] or [2], wherein one of a galvanizing layer, a galvannealing layer, and an electrogalvanizing layer is disposed on a surface.

[4] A method for producing a high-strength cold rolled steel sheet, the method including: a hot rolling process of hot-rolling a steel slab having the composition described in [1] or [2] at a hot rolling start temperature of 1100° C. or higher and 1300° C. or lower and a finish rolling temperature of 800° C. or higher and 1000° C. or lower, and, after the hot rolling, cooling the hot rolled sheet to a cooling stop temperature of 500° C. or lower at an average cooling rate of 5° C./s or more and 50° C./s or less in a temperature range of from 700° C. to the cooling stop temperature, and then coiling the cooled sheet; a pickling process of performing a pickling treatment on the hot rolled steel sheet obtained in the hot rolling process; a cold rolling process of cold-rolling the hot rolled steel sheet, which has been pickled in the pickling process, at a reduction ratio of 30% or more and 70% or less; and an annealing process of holding the cold rolled steel sheet, which is obtained in the cold rolling process, in a temperature range of 750° C. or higher and 900° C. or lower for 10 seconds or more and 900 seconds or less, and, after the holding the sheet, cooling the cold rolled steel sheet to a cooling stop temperature of 100° C. or higher and 250° C. or lower at an average cooling rate of 5° C./s or more, then heating the cooled sheet to a re-heating temperature range of 300° C. or higher and 400° C. or lower, and holding the heated sheet in the re-heating temperature range for 10 seconds or more and 1800 seconds or less.

[5] The method for producing a high-strength cold rolled steel sheet described in [4], the method further including, after the annealing process, a coating process of performing a coating to form one of a galvanizing layer, a galvannealing layer, and an electrogalvanizing layer.

Advantageous Effects

According to the disclosed embodiments, a high-strength cold rolled steel sheet that has a tensile strength of 980 MPa or more, excellent ductility and hole expandability, and excellent weldability is obtained. When the high-strength cold rolled steel sheet of the disclosed embodiments is used in automobile structural elements, a significant contribution can be made to reducing the weight of car bodies and to improving the fuel efficiency of automobiles.

DETAILED DESCRIPTION

Various embodiments will now be described. It should be understood that the disclosure is not intended to be limited by the following specific embodiments.

A high-strength cold rolled steel sheet of the disclosed embodiments has a composition that contains, in terms of mass %, C: 0.04% or more and 0.12% or less, Si: 0.15% or more and 0.95% or less, Mn: 2.00% or more and 3.50% or less, P: 0.050% or less, S: 0.0050% or less, N: 0.0100% or less, Al: 0.010% or more and 2.0% or less, Ti: 0.005% or more and 0.075% or less, Nb: 0.005% or more and 0.075% or less, B: 0.0002% or more and 0.0040% or less, and the balance being Fe and unavoidable impurities.

The composition may further contain, in terms of mass %, at least one element selected from V: 0.005% or more and 0.200% or less, Cr: 0.05% or more and 0.20% or less, Mo: 0.01% or more and 0.20% or less, Cu: 0.05% or more and 0.20% or less, Ni: 0.01% or more and 0.20% or less, Sb: 0.002% or more and 0.100% or less, Sn: 0.002% or more and 0.100% or less, Ca: 0.0005% or more and 0.0050% or less, Mg: 0.0005% or more and 0.0050% or less, and REM: 0.0005% or more and 0.0050% or less.

The individual components will now be described. In the description of the components below, "%" that indicates the content of a component means "mass %".

C: 0.04% or more and 0.12% or less

Carbon (C) has a high solid solution strengthening ability, is effective for increasing the steel sheet strength, and contributes to the formation of retained austenite, martensite, bainite, and tempered martensite in the disclosed embodiments. In order to obtain this effect, the C content needs to be 0.04% or more. At a C content less than 0.04%, it becomes difficult to obtain desired retained austenite and martensite. Meanwhile, at an excessively high C content exceeding 0.12%, retained austenite, martensite, bainite, and tempered martensite form excessively, which results in degradation of ductility, hole expandability, and weldability. Thus, the C content is set to be 0.04% or more and 0.12% or less. The lower limit of the C content is preferably 0.05% or more. The lower limit is more preferably 0.06% or more and yet more preferably 0.07% or more. The upper limit of the C content is preferably 0.11% or less. The upper limit is more preferably 0.10% or less or less than 0.10%, and yet more preferably 0.09% or less.

Si: 0.15% or more and 0.95% or less

Silicon (Si) has a high solid solution strengthening ability in ferrite, contributes to increasing the steel sheet strength, suppresses formation of carbides (cementite), and contributes to stabilization of retained austenite. Moreover, Si dissolved in ferrite improves the work hardening ability and contributes to improving the ductility of the ferrite phase itself. In order to obtain this effect, the Si content needs to be 0.15% or more. Meanwhile, at a Si content exceeding 0.95%, contribution to stabilization of retained austenite is saturated, and weldability is degraded. Thus, the Si content is set within the range of 0.15% or more and 0.95% or less. The lower limit of the Si content is preferably 0.25% or more. The lower limit is more preferably 0.30% or more and yet more preferably 0.35% or more. The upper limit of the Si content is preferably 0.85% or less. The upper limit is more preferably 0.80% or less and yet more preferably 0.70% or less.

Mn: 2.00% or more and 3.50% or less

Manganese (Mn) contributes to increasing the strength of the steel sheet by solid solution strengthening or improved hardenability, and is an essential element for obtaining desired retained austenite and martensite since Mn is an austenite-stabilizing element. In order to obtain this effect, the Mn content needs to be 2.00% or more. Meanwhile, at a Mn content exceeding 3.50%, weldability is degraded, retained austenite and martensite are excessively formed, and hole expandability is degraded. Thus, the Mn content is set within the range of 2.00% or more and 3.50% or less. The lower limit of the Mn content is preferably 2.20% or more. The lower limit is more preferably 2.40% or more and yet more preferably 2.60% or more. The upper limit of the Mn content is preferably 3.30% or less. The upper limit is more preferably 3.10% or less and yet more preferably 2.90% or less.

P: 0.050% or less

Phosphorus (P) is an element that contributes to increasing the strength of the steel sheet through solid solution strengthening. However, at a P content exceeding 0.050%, weldability is degraded, and grain boundary fracture caused by grain boundary segregation is promoted. Thus, the P content is set to be 0.050% or less. The lower limit of the P content is not particularly limited but is preferably 0.0001% or more since excessively decreasing the P content increases the manufacturing cost.

S: 0.0050% or less

Sulfur (S) is an element that segregates in grain boundaries, embrittles the steel during hot-working, and forms sulfides, such as MnS, in the steel so as to degrade local deformability, and a S content exceeding 0.0050% degrades hole expandability. Thus, the S content is limited to 0.0050% or less. The lower limit of the S content is not particularly limited but is preferably 0.0001% or more since excessively decreasing the S content increases the manufacturing cost.

N: 0.0100% or less

Nitrogen (N) is an element that forms nitrides in the steel and degrades local deformability, and a N content exceeding 0.0100% degrades hole expandability. Thus, the N content is limited to 0.0100% or less. The lower limit of the N content is not particularly limited but is preferably 0.0001% or more since excessively decreasing the N content increases the manufacturing cost.

Al: 0.010% or more and 2.0% or less

Aluminum (Al) is a ferrite generating element, and, as with Si, is an element that suppresses generation of carbides (cementite) and contributes to stabilization of retained austenite. In order to obtain this effect, the Al content needs to be 0.010% or more. The Al content is preferably 0.015% or more and yet more preferably 0.020% or more. Meanwhile, at an Al content exceeding 2.0%, the effect is saturated, and thus the Al content is set to 2.0% or less. The Al content is preferably 1.8% or less and more preferably 1.6% or less. The effects of the disclosed embodiments are exhibited when the total content of Al and Si is 0.95% or less.

Ti: 0.005% or more and 0.075% or less

Titanium (Ti) is an element that contributes to increasing the strength by not only forming fine carbides and nitrides, but also suppressing crystal grain coarsening, and through refinement of the steel microstructure after heating. Furthermore, addition of Ti is effective for preventing the reaction between B and N. In order to obtain this effect, the Ti content needs to be 0.005% or more. The Ti content is preferably 0.010% or more and yet more preferably 0.020% or more. Meanwhile, at a Ti content exceeding 0.075%, carbides and nitrides are excessively generated, and the ductility is degraded. Thus, the Ti content is set within the range of 0.005% or more and 0.075% or less. The Ti content is preferably 0.060% or less and yet more preferably 0.050% or less.

Nb: 0.005% or more and 0.075% or less

Niobium (Nb) contributes to increasing the strength by not only forming fine carbides and nitrides, but also suppressing crystal grain coarsening and through refinement of the steel microstructure after heating. In order to obtain this effect, the Nb content needs to be 0.005% or more. The Nb content is preferably 0.010% or more and yet more preferably 0.015% or more. Meanwhile, at a Nb content exceeding 0.075%, carbides and nitrides are excessively generated, and the ductility is degraded. Thus, the Nb content is set within the range of 0.005% or more and 0.075% or less. The Nb content is preferably 0.060% or less and yet more preferably 0.050% or less. More preferably, the Nb content is less than 0.040%.

B: 0.0002% or more and 0.0040% or less

Boron (B) is an element effective for improving hardenability and contributes to increasing the strength. In order to obtain this effect, the B content needs to be 0.0002% or more. The B content is preferably 0.0007% or more and more preferably 0.0011% or more. Meanwhile, at a B content exceeding 0.0040%, martensite is excessively generated, and thus ductility and hole expandability are degraded. Thus, the B content is set within the range of 0.0002% or more and 0.0040% or less. The B content is preferably 0.0035% or less and more preferably 0.0030% or less.

Although the components described above are the basic components, in the disclosed embodiments, in addition to the basic components, at least one element (optional component) selected from V: 0.005% or more and 0.200% or less, Cr: 0.05% or more and 0.20% or less, Mo: 0.01% or more and 0.20% or less, Cu: 0.05% or more and 0.20% or less, Ni: 0.01% or more and 0.20% or less, Sb: 0.002% or more and 0.100% or less, Sn: 0.002% or more and 0.100% or less, Ca: 0.0005% or more and 0.0050% or less, Mg: 0.0005% or more and 0.0050% or less, and REM: 0.0005% or more and 0.0050% or less can be contained.

Vanadium (V) contributes to strengthening of the steel sheet through formation of V-based precipitates and contributes to refinement and homogeneity of the steel microstructure. In order to obtain this effect, the V content needs to be 0.005% or more. The V content is preferably 0.007% or more and more preferably 0.010% or more. Meanwhile, at a V content exceeding 0.200%, V-based precipitates are excessively generated, and ductility is degraded. Thus, when V is to be contained, the V content is preferably limited to be within the range of 0.005% or more and 0.200% or less. The V content is preferably 0.100% or less and more preferably 0.050% or less.

Chromium (Cr) contributes to increasing the strength of the steel sheet through solid solution strengthening, improves hardenability, and contributes to increasing the strength by promoting formation of martensite. In order to obtain this effect, the Cr content needs to be 0.05% or more. The Cr content is more preferably 0.06% or more and yet more preferably 0.07% or more. Meanwhile, at a Cr content exceeding 0.20%, martensite is excessively generated, and thus ductility and hole expandability are degraded. Thus, when Cr is to be contained, the Cr content is preferably limited to be within the range of 0.05% or more and 0.20% or less. The Cr content is preferably 0.15% or less and yet more preferably 0.10% or less.

Molybdenum (Mo) contributes to increasing the strength of the steel sheet through solid solution strengthening, improves hardenability, and contributes to increasing the strength by promoting formation of martensite. In order to obtain this effect, the Mo content needs to be 0.01% or more. The Mo content is more preferably 0.02% or more and yet more preferably 0.04% or more. Meanwhile, at a Mo content exceeding 0.20%, martensite is excessively generated, and thus ductility and hole expandability are degraded. Thus, when Mo is to be contained, the Mo content is preferably limited to be within the range of 0.01% or more and 0.20% or less. The Mo content is preferably 0.15% or less and yet more preferably 0.10% or less.

Copper (Cu) contributes to increasing the strength of the steel sheet through solid solution strengthening, improves hardenability, and contributes to increasing the strength by promoting formation of martensite. In order to obtain this effect, the Cu content needs to be 0.05% or more. The Cu content is preferably 0.06% or more and yet more preferably 0.07% or more. Meanwhile, at a Cu content exceeding 0.20%, the effect of increasing the strength is excessive, and thus ductility and hole expandability are degraded. Thus, when Cu is to be contained, the Cu content is preferably limited to be within the range of 0.05% or more and 0.20% or less. The Cu content is preferably 0.15% or less and yet more preferably 0.10% or less.

Nickel (Ni) contributes to increasing the strength of the steel sheet through solid solution strengthening, improves hardenability, and contributes to increasing the strength by promoting formation of martensite. In order to obtain this effect, the Ni content needs to be 0.01% or more. The Ni content is preferably 0.02% or more and more preferably 0.05% or more. Meanwhile, at a Ni content exceeding 0.20%, the effect of increasing the strength is excessive, and thus ductility and hole expandability are degraded. Thus, when Ni is to be contained, the Ni content is preferably limited to be within the range of 0.01% or more and 0.20% or less. The Ni content is preferably 0.15% or less and yet more preferably 0.10% or less.

Antimony (Sb) and tin (Sn) have an effect of suppressing decarburization of a steel sheet surface layer (a region that spans about several ten micrometers from the surface in the sheet thickness direction) that occurs due to oxidation of the steel sheet surface. When such decarburization of the steel sheet surface layer is suppressed, it becomes possible to prevent the decrease in the amount of martensite generated in the steel sheet surface layer, and this is effective for securing the desired steel sheet strength. In order to obtain this effect, the Sb content and the Sn content need to be 0.002% or more each. However, at a content exceeding 0.100% for each of Sb and Sn, the effect thereof is saturated. Thus, when Sb and Sn are to be contained, the Sb and Sn contents are preferably each limited to be within the range of 0.002% or more and 0.100% or less.

Calcium (Ca), magnesium (Mg), and a rare earth metal (REM) are elements used for deoxidization, and also are elements that have an effect of making sulfides spherical and alleviating adverse effects of sulfides on local ductility and hole expandability. In order to obtain this effect, the Ca, Mg, and REM contents need to be 0.0005% or more each. Meanwhile, at a content exceeding 0.0050%, the amount of inclusions increases, and ductility and hole expandability are degraded due to occurrence of surface defects and internal defects. Thus, when these elements are to be contained, the Ca, Mg, and REM contents are preferably each limited to be within the range of 0.0005% or more and 0.0050% or less.

The balance other than the above-described elements is Fe and unavoidable impurities. If the contents of the optional components described above are less than the lower limits, these optional elements are deemed to be contained as unavoidable impurities.

Next, the steel microstructure of the high-strength cold rolled steel sheet of the disclosed embodiments is described. The steel microstructure includes, in terms of volume fraction, 35% or less of ferrite, 1% or more and 10% or less of retained austenite, 2% or more and 12% or less of as-quenched martensite, and the balance being bainite and tempered martensite.

Furthermore, the steel microstructure satisfies: an average crystal grain diameter of the ferrite: 5.0 µm or less, an average crystal grain diameter of the retained austenite: 2.0 µm or less, an average crystal grain diameter of martensite:

3.0 μm or less, an average crystal grain diameter of the bainite and the tempered martensite phase: 4.0 μm or less, and an average intergrain distance of martensite of 1.0 μm or more.

Ferrite: volume fraction of 35% or less and average crystal grain diameter of 5.0 μm or less Ferrite is a microstructure that contributes to improving ductility (elongation). However, when the volume fraction exceeds 35%, it becomes difficult to obtain desired amounts of bainite and tempered martensite, etc., and hole expandability is degraded. Thus, the volume fraction of ferrite is set to be in the range of 35% or less. The volume fraction is preferably 33% or less and more preferably 30% or less. From the viewpoint of improving ductility, the volume fraction of ferrite is preferably 10% or more. The volume fraction is more preferably 15% or more and yet more preferably 20% or more.

Moreover, when the average crystal grain diameter of ferrite exceeds 5.0 μm, voids generated in punched edge portions during hole expansion are likely to become connected to one another during hole expansion, and satisfactory hole expandability is not obtained. Thus, the average crystal grain diameter of ferrite is set to be in the range of 5.0 μm or less. The average crystal grain diameter of ferrite is preferably 4.5 μm or less and more preferably 4.0 μm or less. The average crystal grain diameter of ferrite is typically 1.0 μm or more, or 2.0 μm or more.

Retained austenite: volume fraction of 1% or more and 10% or less and average crystal grain diameter of 2.0 μm or less Retained austenite is itself a highly ductile phase, but is a microstructure that contributes to further improving the ductility through strain-induced transformation, and thus contributes to improving the ductility and the strength-ductility balance. In order to obtain this effect, the volume fraction of the retained austenite needs to be 1% or more. The volume fraction is preferably 2% or more and more preferably 3% or more. However, at a volume fraction exceeding 10%, hole expandability is degraded. Thus, the volume fraction of retained austenite is set within the range of 1% or more and 10% or less. The volume fraction of retained austenite is preferably 8% or less and more preferably 6% or less.

Moreover, when the average crystal grain diameter of retained austenite exceeds 2.0 μm, growth of voids generated during the hole expanding test readily occurs, and hole expandability is degraded. Thus, the average crystal grain diameter of retained austenite is set to be in the range of 2.0 μm or less. The average crystal grain diameter is preferably 1.5 μm or less and more preferably 1.0 μm or less. The average crystal grain diameter of retained austenite is typically 0.1 μm or more, or 0.3 μm or more.

Martensite: volume fraction of 2% or more and 12% or less and average crystal grain diameter of 3.0 μm or less In order to obtain a tensile strength of 980 MPa or more, the volume fraction of martensite needs to be 2% or more. The volume fraction is preferably 4% or more and more preferably 6% or more. Meanwhile, at a volume fraction exceeding 12%, voids readily occur at the interface between martensite and ferrite during the hole expanding test, and hole expansion ratio is degraded. Thus, the volume fraction of martensite is set within the range of 2% or more and 12% or less. The volume fraction of martensite is preferably 11% or less and yet more preferably 10% or less. Martensite referred herein means as-quenched martensite and is distinguished from tempered martensite described below.

Moreover, when the average crystal grain diameter of martensite exceeds 3.0 μm, growth of voids generated during the hole expanding test readily occurs, and hole expandability is degraded. Thus, the average crystal grain diameter of martensite is set to be in the range of 3.0 μm or less. The average crystal grain diameter is preferably 2.5 μm or less and more preferably 2.0 μm or less. The average crystal grain diameter of martensite is typically 0.5 μm or more, or 0.7 μm or more.

Bainite and tempered martensite: average crystal grain diameter of 4.0 μm or less "Tempered martensite" referred herein is martensite that became tempered when martensite, which is generated by performing cooling to a cooling temperature range, is heated to the re-heating temperature range and held thereat in the annealing process. Bainite and tempered martensite decrease the difference in hardness between soft ferrite and hard martensite and retained austenite, and contributes to improving the hole expandability. Thus, the microstructure needs to include bainite and tempered martensite having an average crystal grain diameter of 4.0 μm or less. Meanwhile, if the average crystal grain diameter exceeds 4.0 μm, voids generated in the punched fracture surface during hole expansion are likely to be connected to one another, and satisfactory hole expandability is not obtained. Thus, the average crystal grain diameter of bainite and tempered martensite is set to be in the range of 4.0 μm or less. The average crystal grain diameter is preferably 3.8 μm or less and more preferably 3.4 μm or less. The average crystal grain diameter is typically 1.5 μm or more, or 2.0 μm or more. Note that the "average crystal grain diameter of bainite and tempered martensite" means the average crystal grain diameter derived without distinguishing between bainite and tempered martensite.

The total volume fraction of bainite and tempered martensite is set to be 25% or more in order to decrease the difference in hardness between soft ferrite and hard martensite and retained austenite, and to contribute to improving the hole expandability. The total volume fraction is preferably 30% or more and more preferably 35% or more. Since an excessively large total volume fraction degrades ductility, the total volume fraction is set to be 70% or less. The total volume fraction is preferably 65% or less and yet more preferably less than 60%. The volume fraction of tempered martensite is often 59% or less.

Average intergrain distance of martensite: 1.0 μm or more

Voids are generated at the interface between a soft phase and a hard phase, and grow as neighboring voids connect to one another to form cracks. When the distance between voids is small, voids readily connect to one another and thus local deformability and hole expandability are degraded. Thus, in order to ensure satisfactory ductility and hole expandability, the average intergrain distance of martensite needs to be 1.0 μm or more. The average intergrain distance is preferably 1.5 μm or more and more preferably 2.0 μm or more. The average intergrain distance is preferably 9.0 μm or less and more preferably 7.0 μm or less. The average intergrain distance $\Lambda_m$ of martensite is calculated by using formula (1) below (Tetsu-to-Hagane, vol. 91 (2005) pp. 796-802). Moreover, as mentioned above, martensite means as-quenched martensite. When the average intergrain distance of martensite is within the above-described range, uniform elongation (uEl) tends to increase.

$$\Lambda_m \{0.9(V_m/100)^{-1/2} - 0.8\} \times d_m \qquad (1)$$

where $V_m$: volume fraction (%) of martensite, $d_m$: average crystal grain diameter (μm) of martensite In addition to the microstructures described above, un-recrystallized ferrite, pearlite, and cementite may occur in some cases; however, as long as the limitations above are satisfied, the object of the disclosed embodiments can be achieved. However, the volume fractions of the un-recrystallized ferrite, pearlite, and cementite are preferably 10% or less, 5% or less, and 5% or less, respectively.

The area fractions, average crystal grain diameters, and average intergrain distance described above are values obtained by the methods described in Examples.

The thickness of the high-strength cold rolled steel sheet described above can be appropriately set to suit the usage. Typically, the thickness is 0.8 to 2.5 mm.

The high-strength cold rolled steel sheet having the composition and microstructure described above may further include a coating layer as its surface to improve the corrosion resistance. The coating layer is preferably one of a galvanizing layer, a galvannealing layer, and an electrogalvanizing layer. Any known galvanizing layers, galvannealing layers, and electrogalvanizing layers are preferable as the galvanizing layer, the galvannealing layer, and the electrogalvanizing layer.

The high-strength cold rolled steel sheet of the disclosed embodiments has a tensile strength (TS) of 980 MPa or more, a breaking elongation (El) of 12% or more, and a hole expansion ratio $\lambda$ of 40% or more measured in Examples. Although the upper limits of these are not particularly limited, they are typically 1200 MPa for TS, 20% or less for El, and 80% or less for $\lambda$ in the disclosed embodiments. Although not essential to solve the problem of the disclosed embodiments, uEl is frequently 9.5% or more. Preferably, uEl is 10.0% or more.

Next, a method for producing a high-strength cold rolled steel sheet of the disclosed embodiments is described. In the disclosed embodiments, a hot rolling process, a pickling process, a cold rolling process, and an annealing process are sequentially performed on a steel having the composition described above so as to produce a high-strength cold rolled steel sheet.

The steel slab used in hot rolling is preferably a cast slab (steel) having predetermined dimensions obtained by preparing a molten steel having the composition described above by a common melting method that uses a converter or the like and using a continuous casting method from the viewpoint of suppressing segregation of the components. The slab may be obtained by an ingot making method or a thin-slab casting method.

A hot rolling process is performed on the steel having the composition described above to obtain a hot rolled sheet (hot rolled steel sheet).

In the hot rolling process, instead of a process that involves re-heating the steel having the composition described above and hot-rolling the re-heated steel, a process that involves charging a still-hot, cast steel slab into a heating furnace without cooling the steel slab, re-heating the steel slab, and rolling the re-heated slab, a process that involves performing heat retention on a steel slab without cooling and then performing rolling immediately thereafter, or a process that involves rolling a steel slab immediately after casting may be employed. Specific conditions of the hot rolling process are as follows.

Hot rolling start temperature: 1100° C. or higher and 1300° C. or lower

When the hot rolling start temperature is lower than 1100° C., the rolling load increases and the productivity is degraded; meanwhile, at a temperature higher than 1300° C., the heating cost increases. Thus, the hot rolling start temperature is set to be in the range of 1100° C. or higher and 1300° C. or lower.

Finish rolling temperature: 800° C. or higher and 1000° C. or lower

When the finish rolling temperature is lower than 800° C., the steel microstructure becomes un-uniform, and ductility and hole expandability after the annealing process are degraded. By setting the finish rolling temperature to 800° C. or higher, rolling completes in the austenite single phase range, and a homogeneous steel sheet microstructure is obtained. The finish rolling temperature is preferably 850° C. or higher. Meanwhile, when the finish rolling temperature exceeds 1000° C., the microstructure of the hot rolled steel sheet coarsens, and a microstructure having desired crystal grain diameters is not obtained after the annealing process. The finish rolling temperature is preferably 950° C. or lower. Thus, the finish rolling temperature is set to be 800° C. or higher and 1000° C. or lower.

Average cooling rate from 700° C. to cooling stop temperature: 5° C./s or more and 50° C./s or less When the average cooling rate from 700° C. to cooling stop temperature after hot rolling is set to 5° C./s or more and 50° C./s or less, the microstructure of the hot rolled steel sheet is controlled to be mainly composed of bainite. At a rate less than 5° C./s, ferrite or pearlite occurs excessively in the microstructure of the hot rolled steel sheet. The rate is preferably 15° C./s or more. At a rate exceeding 50° C./s, the effect of suppressing occurrence of ferrite or pearlite is saturated. Thus, the average cooling rate is set to 5° C./s or more and 50° C./s or less. Cooling conditions that apply after completion of hot rolling to 700° C. are not particularly limited, and the steel sheet may be left to cool or cooled with cooling means.

Cooling stop temperature: 500° C. or lower

When the cooling stop temperature for the cooling described above is set to 500° C. or lower, the hot rolled steel sheet is homogenized and forms a microstructure mainly composed of bainite. As a result of this homogenization, the steel microstructure, in particular, ferrite and martensite, after the annealing process becomes finer, and the desired martensite average intergrain distance is obtained. However, at a cooling stop temperature exceeding 500° C., ferrite or pearlite occur excessively in the microstructure of the hot rolled steel sheet, and the steel microstructure after the annealing process becomes inhomogeneous. As a result of this homogeneity, ferrite or martensite having the desired average crystal grain diameter is not obtained, the desired martensite average intergrain distance is not obtained, and thus hole expandability is degraded. The lower limit of the cooling stop temperature is not particularly specified; however, at a temperature lower than 350° C., hard martensite occurs excessively in the microstructure of the hot rolled steel sheet, and the rolling load during cold rolling may increase. Thus, the cooling stop temperature is preferably 350° C. or higher.

Next, the obtained hot-rolled sheet is subjected to a pickling process to remove the scale on the steel sheet surface layer. The pickling conditions need not be limited, and any common pickling method that uses hydrochloric acid, sulfuric acid, or the like can be employed.

In a cold rolling process, the hot-rolled sheet that has undergone the pickling process is cold-rolled into a cold rolled sheet (cold rolled steel sheet) having a particular thickness.

Reduction ratio in cold rolling: 30% or more and 70% or less

In cold rolling, work strain is introduced to the steel sheet. As a result, in the subsequent annealing process, recrystallization in the annealing temperature range is accelerated, and the crystal grain diameters of the final microstructure are controlled. At a reduction ratio less than 30%, the work strain applied to the steel sheet is insufficient, and recrystallization is not sufficiently achieved in the annealing process; thus, in the final steel microstructure, un-recrystallized ferrite occurs excessively, the desired martensite average intergrain distance is not achieved, and thus ductility and hole expandability are degraded. Meanwhile, at a reduction ratio exceeding 70%, excessive work strain is introduced to the steel sheet, recrystallization in the annealing temperature range is excessively accelerated in the annealing process, and the average crystal grain diameter of ferrite, martensite, bainite, or tempered martensite is increased. Thus, the reduction ratio in cold rolling is set to be in the range of 30% or more and 70% or less.

Next, the obtained cold rolled sheet is subjected to an annealing process.

The annealing process is performed to form the desired ferrite, retained austenite, martensite, bainite, and martensite in the steel sheet, and as a result, a high-strength cold rolled steel sheet having high ductility and high hole expandability is obtained. The specific conditions for the annealing process are as follows.

Annealing temperature: 750° C. or higher and 900° C. or lower

At an annealing temperature lower than 750° C., the volume fraction of austenite in the annealing temperature range is decreased, and thus not only ferrite occurs excessively but also recrystallization does not sufficiently proceed, resulting in excessive occurrence of un-recrystallized ferrite and degradation of hole expandability. In contrast, at an annealing temperature exceeding 900° C., the austenite grains excessively coarsen, and it becomes difficult to obtain the desired crystal grain diameter. Thus, the annealing temperature is set to be 750° C. or higher and 900° C. or lower. The lower limit of the annealing temperature is preferably 770° C. or higher. The upper limit of the annealing temperature is preferably 880° C. or lower. The heating conditions up to the annealing temperature are not particularly limited.

Holding time in annealing temperature range: 10 seconds or more and 900 seconds or less When the holding time in the annealing temperature range is less than 10 seconds, not only recrystallization does not sufficiently proceed but also austenite cannot sufficiently occur in the annealing temperature range, and, un-recrystallized ferrite and ferrite will occur excessively at the final stage. When the holding time exceeds 900 seconds, the steel microstructure and mechanical properties obtained at the final stage are not affected. Thus, the holding time in the annealing temperature range is set to be in the range of 10 seconds or more and 900 seconds or less. Here, "hold" encompasses not only isothermal holding but also gradual cooling and heating within the temperature range.

Average cooling rate to cooling stop temperature: 5° C./s or more

When the average cooling rate from the annealing temperature to the cooling stop temperature is less 5° C./s, not only pearlite in addition to ferrite occurs excessively during cooling but also it becomes difficult to obtain the desired amounts of bainite and tempered martensite. Although cooling is preferably performed by gas cooling, it is possible to combine furnace cooling, mist cooling, roll cooling, water cooling, etc. The upper limit of the average cooling rate is not particularly limited but is typically 50° C./s or less.

Cooling stop temperature: 100° C. or higher and 250° C. or lower

When the cooling stop temperature is lower than 100° C., a large amount of martensite occurs at the time cooling is stopped, and transforms into a large amount of tempered martensite during re-heating, thereby degrading ductility. Meanwhile, when the cooling stop temperature exceeds 250° C., not only excessive martensite is obtained at the final stage, but also the desired average intergrain distance $\Lambda_m$ is not obtained, and hole expandability is degraded. Thus, the cooling stop temperature is limited to a temperature within the cooling stop temperature range of 100° C. or higher and 250° C. or lower.

Re-heating temperature: 300° C. or higher and 400° C. or lower

Re-heating is performed to temper martensite generated during cooling, transform untransformed austenite to bainite, and obtain bainite and retained austenite. At a re-heating temperature lower than 300° C., martensite is not sufficiently tempered, the martensite phase occurs excessively at the final stage, the desired average intergrain distance $\Lambda_m$ is not obtained, and ductility and hole expandability are degraded. Meanwhile, at a re-heating temperature exceeding 400° C., not only ferrite occurs excessively but also the desired amount of martensite is not obtained. Thus, the re-heating temperature is limited to 300° C. or higher and 400° C. or lower. The heating conditions up to the re-heating temperature are not particularly limited.

Holding time in re-heating temperature range: 10 seconds or more and 1800 seconds or less When the holding time in the re-heating temperature range is less than 10 seconds, martensite is not sufficiently tempered, martensite occurs excessively at the final stage, the desired average intergrain distance $\Lambda_m$ is not obtained, and hole expandability is degraded. Meanwhile, the steel microstructure is not affected when the time exceeds 1800 seconds. Thus, the holding time in the re-heating temperature range is set to 10 seconds or more and 1800 seconds or less. Here, "hold" encompasses not only isothermal holding but also gradual cooling and heating within the temperature range.

Cooling performed after holding in the re-heating temperature range is not particularly regulated, and cooling may be performed to the desired temperature, such as room temperature, by any method such as allowing the sheet to cool.

In the production method of the disclosed embodiments, skinpass rolling may be performed after annealing. The extension ratio for skinpass rolling is not particularly regulated, but excessive extension degrades ductility. Thus, the extension ratio is preferably 0.1% or more and 2.0% or less.

After the annealing process described above, a coating process may be further conducted to form a coating layer on the surface. The coating process is preferably a galvanizing process, the combination of a galvanizing process and an alloying process, or an electrogalvanizing process. Any known methods are suitable for the galvanizing process, the combination of galvanizing process and an alloying process, or an electrogalvanizing process.

EXAMPLES

A molten steel having a composition shown in Table 1 was prepared in a converter and formed into a slab with a thickness of 230 mm by a continuous casting method. The obtained steel was subjected to the hot rolling process under the conditions shown in Table 2 to form a hot rolled steel sheet. The obtained hot rolled steel sheet was pickled and subjected to a cold rolling process at a cold rolling reduction ratio shown in Table 2 to obtain a cold rolled steel sheet. In pickling, hydrochloric acid was used. Then, annealing was performed under the conditions shown in Table 2.

Note that some of the cold rolled steel sheets were further subjected to a galvanizing process after annealing to form a galvanizing layer on the surface so as to form a galvanized steel sheet (GI). In the galvanizing process, a continuous galvanizing line was used, and the annealed cold rolled annealed sheet was re-heated to a temperature in the range of 430° C. to 480° C. as needed, and immersed in a galvanizing bath (bath temperature: 470° C.) so as to control the coating weight of the coating layer to 45 g/m² per side. The bath composition was set to Zn-0.18 mass % Al. Some of the galvanized steel sheets were prepared by using a bath composition of Zn-0.14 mass % Al, and, after the galvanizing process, were subjected to an alloying process at 520° C. so as to obtain galvannealed steel sheets (GA). The Fe concentration in the coating layer was adjusted to 9 mass % or more and 12 mass % or less.

After completion of the annealing process, some of the cold rolled steel sheets were subjected to an electrogalvanizing process by using an electrogalvanizing line so that the coating weight was 30 g/m² per side so as to obtain electrogalvanized steel sheets (EG).

TABLE 1

| Steel type | Composition (mass %) | | | | | | | | | | Other components | Remarks |
|---|---|---|---|---|---|---|---|---|---|---|---|---|
| | C | Si | Mn | P | S | N | Al | Ti | Nb | B | | |
| A | 0.10 | 0.82 | 2.40 | 0.005 | 0.0020 | 0.0034 | 0.041 | 0.025 | 0.030 | 0.0023 | | Example steel |
| B | 0.05 | 0.48 | 3.12 | 0.010 | 0.0015 | 0.0025 | 0.030 | 0.012 | 0.028 | 0.0020 | | Example steel |
| C | 0.08 | 0.20 | 3.22 | 0.007 | 0.0011 | 0.0043 | 0.035 | 0.024 | 0.015 | 0.0014 | Cr:0.08 | Example steel |
| D | 0.07 | 0.93 | 2.84 | 0.002 | 0.0008 | 0.0036 | 0.024 | 0.020 | 0.021 | 0.0009 | Mo:0.05 | Example steel |
| E | 0.11 | 0.35 | 2.08 | 0.012 | 0.0010 | 0.0029 | 0.040 | 0.035 | 0.022 | 0.0020 | V:0.012, Cu:0.07 | Example steel |
| F | 0.09 | 0.56 | 3.46 | 0.009 | 0.0022 | 0.0030 | 0.030 | 0.022 | 0.036 | 0.0019 | | Example steel |
| G | 0.08 | 0.59 | 2.59 | 0.001 | 0.0009 | 0.0045 | 0.039 | 0.017 | 0.018 | 0.0010 | | Example steel |
| H | 0.09 | 0.49 | 2.63 | 0.020 | 0.0016 | 0.0021 | 1.870 | 0.008 | 0.024 | 0.0013 | | Example steel |
| I | 0.06 | 0.74 | 2.88 | 0.011 | 0.0009 | 0.0039 | 0.040 | 0.063 | 0.014 | 0.0012 | Ca:0.0020, Mg:0.0008 | Example steel |
| J | 0.08 | 0.55 | 2.97 | 0.025 | 0.0026 | 0.0042 | 0.029 | 0.027 | 0.006 | 0.0021 | Ni:0.03 | Example steel |
| K | 0.11 | 0.34 | 2.21 | 0.017 | 0.0011 | 0.0037 | 0.051 | 0.010 | 0.069 | 0.0019 | Sb:0.008, Sn:0.005 | Example steel |
| L | 0.05 | 0.73 | 3.20 | 0.008 | 0.0017 | 0.0029 | 0.031 | 0.030 | 0.011 | 0.0006 | Ni:0.08 | Example steel |
| M | 0.08 | 0.55 | 2.54 | 0.020 | 0.0015 | 0.0040 | 0.029 | 0.024 | 0.039 | 0.0015 | REM:0.001 | Example steel |
| <u>N</u> | <u>0.02</u> | 0.84 | 2.43 | 0.008 | 0.0010 | 0.0048 | 0.041 | 0.035 | 0.032 | 0.0022 | | Comparative Steel |
| <u>O</u> | <u>0.17</u> | 0.62 | 2.15 | 0.001 | 0.0015 | 0.0028 | 0.048 | 0.040 | 0.019 | 0.0015 | | Comparative Steel |
| <u>P</u> | 0.07 | <u>0.08</u> | 2.88 | 0.020 | 0.0008 | 0.0045 | 0.038 | 0.037 | 0.045 | 0.0022 | | Comparative Steel |
| <u>Q</u> | 0.09 | <u>1.38</u> | 2.24 | 0.011 | 0.0016 | 0.0026 | 0.030 | 0.017 | 0.031 | 0.0011 | | Comparative Steel |
| <u>R</u> | 0.10 | 0.45 | <u>1.52</u> | 0.009 | 0.0013 | 0.0038 | 0.047 | 0.025 | 0.045 | 0.0027 | | Comparative Steel |
| <u>S</u> | 0.08 | 0.71 | <u>3.78</u> | 0.022 | 0.0020 | 0.0029 | 0.036 | 0.020 | 0.022 | 0.0030 | | Comparative Steel |
| <u>T</u> | 0.08 | 0.70 | 2.90 | 0.007 | 0.0010 | 0.0036 | 0.020 | <u>0.092</u> | 0.032 | 0.0012 | | Comparative Steel |
| <u>U</u> | 0.06 | 0.55 | 2.49 | 0.013 | 0.0017 | 0.0042 | 0.040 | 0.021 | <u>0.085</u> | 0.0009 | | Comparative Steel |
| <u>V</u> | 0.09 | 0.82 | 3.12 | 0.006 | 0.0010 | 0.0033 | 0.038 | 0.031 | 0.017 | <u>0.0064</u> | | Comparative Steel |

* Underlined figures are outside the ranges of the disclosed embodiments.

TABLE 2

| | | Hot rolling process | | | | Cold rolling process | | | Annealing temperature process | | | | | |
|---|---|---|---|---|---|---|---|---|---|---|---|---|---|---|
| | | Heating start temperature (° C.) | Finish rolling temperature (° C.) | Average cooling rate*1 (° C./s) | Cooling stop temperature (° C.) | Hot rolled sheet thickness (mm) | Cold rolled sheet thickness (mm) | Cold rolling reduction (%) | Annealing temperature (° C.) | Holding time in annealing temperature range (s) | Average cooling rate*2 (° C./s) | Cooling stop temperature (° C.) | Re-heating temperature (° C.) | Holding time in re-heating temperature range (s) | |
| 1 | A | 1150 | 940 | 50 | 460 | 2.5 | 1.4 | 44 | 850 | 120 | 25 | 160 | 360 | 300 | Example |
| 2 | B | 1230 | 860 | 45 | 500 | 3.0 | 1.2 | 60 | 820 | 100 | 15 | 210 | 330 | 150 | Example |
| 3 | C | 1180 | 870 | 45 | 480 | 2.8 | 1.2 | 57 | 790 | 60 | 15 | 230 | 300 | 620 | Example |
| 4 | D | 1120 | 930 | 30 | 490 | 2.4 | 1.0 | 58 | 840 | 300 | 20 | 180 | 300 | 800 | Example |
| 5 | E | 1240 | 950 | 50 | 430 | 2.4 | 1.6 | 33 | 830 | 50 | 20 | 120 | 340 | 200 | Example |
| 6 | F | 1110 | 870 | 20 | 380 | 2.6 | 1.8 | 31 | 780 | 400 | 30 | 180 | 370 | 50 | Example |
| 7 | G | 1220 | 850 | 40 | 450 | 2.0 | 0.9 | 55 | 850 | 100 | 20 | 200 | 300 | 160 | Example |
| 8 | H | 1250 | 880 | 50 | 400 | 3.5 | 1.6 | 54 | 860 | 100 | 15 | 220 | 320 | 350 | Example |
| 9 | I | 1270 | 900 | 40 | 500 | 3.0 | 1.2 | 60 | 800 | 800 | 25 | 150 | 380 | 110 | Example |
| 10 | J | 1120 | 980 | 45 | 480 | 2.8 | 1.4 | 50 | 790 | 150 | 10 | 130 | 310 | 1200 | Example |
| 11 | K | 1160 | 820 | 35 | 410 | 2.2 | 1.4 | 36 | 770 | 100 | 30 | 130 | 390 | 600 | Example |
| 12 | L | 1200 | 900 | 20 | 490 | 3.4 | 2.0 | 41 | 840 | 200 | 25 | 200 | 350 | 550 | Example |
| 13 | M | 1220 | 870 | 40 | 390 | 3.2 | 1.6 | 50 | 830 | 50 | 10 | 170 | 330 | 460 | Example |
| 14 | N | 1150 | 860 | 30 | 430 | 2.4 | 1.0 | 58 | 800 | 100 | 25 | 150 | 340 | 250 | Comparative Example |
| 15 | O | 1200 | 880 | 45 | 480 | 2.0 | 0.9 | 55 | 860 | 300 | 20 | 190 | 310 | 500 | Comparative Example |
| 16 | P | 1240 | 880 | 30 | 500 | 2.8 | 1.6 | 43 | 810 | 60 | 15 | 140 | 350 | 150 | Comparative Example |
| 17 | Q | 1130 | 920 | 25 | 480 | 3.0 | 1.3 | 57 | 780 | 150 | 25 | 200 | 360 | 720 | Comparative Example |
| 18 | R | 1230 | 960 | 40 | 450 | 3.8 | 2.0 | 47 | 860 | 200 | 20 | 170 | 380 | 200 | Comparative Example |
| 19 | S | 1110 | 970 | 45 | 400 | 2.8 | 1.2 | 57 | 770 | 100 | 25 | 150 | 320 | 400 | Comparative Example |
| 20 | T | 1250 | 940 | 30 | 460 | 2.2 | 1.0 | 55 | 800 | 70 | 10 | 200 | 300 | 170 | Comparative Example |
| 21 | U | 1150 | 940 | 25 | 490 | 2.6 | 1.6 | 38 | 850 | 120 | 20 | 140 | 350 | 600 | Comparative Example |
| 22 | V | 1190 | 900 | 50 | 460 | 2.8 | 1.4 | 50 | 840 | 200 | 30 | 150 | 360 | 80 | Comparative Example |
| 23 | A | 1180 | 930 | 40 | <u>720</u> | 3.2 | 1.4 | 56 | 800 | 100 | 25 | 180 | 330 | 550 | Comparative Example |
| 24 | A | 1240 | 900 | 35 | <u>450</u> | 2.4 | 1.8 | <u>25</u> | 790 | 200 | 15 | 230 | 340 | 200 | Comparative Example |
| 25 | A | 1200 | 880 | 25 | 480 | 3.5 | 0.9 | <u>74</u> | 820 | 50 | 20 | 200 | 360 | 350 | Comparative Example |
| 26 | A | 1100 | 850 | 30 | 420 | 2.4 | 1.0 | 58 | <u>720</u> | 150 | 25 | 180 | 310 | 850 | Comparative Example |
| 27 | A | 1230 | 830 | 40 | 460 | 2.2 | 1.0 | 55 | <u>930</u> | 110 | 25 | 150 | 350 | 300 | Comparative Example |
| 28 | B | 1220 | 970 | 50 | 420 | 3.0 | 1.4 | 53 | 830 | <u>3</u> | 20 | 180 | 320 | 550 | Comparative Example |
| 29 | B | 1170 | 870 | 40 | 450 | 3.2 | 1.8 | 44 | 800 | <u>70</u> | <u>2</u> | 200 | 340 | 350 | Comparative Example |
| 30 | A | 1200 | 870 | 50 | 400 | 3.6 | 1.6 | 56 | 840 | 230 | <u>25</u> | <u>70</u> | 300 | 700 | Comparative Example |
| 31 | A | 1150 | 980 | 50 | 420 | 2.0 | 1.2 | 40 | 850 | 100 | 20 | <u>290</u> | 350 | 300 | Comparative Example |
| 32 | A | 1260 | 940 | 45 | 430 | 2.4 | 1.0 | 58 | 810 | 300 | 20 | <u>160</u> | <u>280</u> | 250 | Comparative Example |
| 33 | A | 1130 | 900 | 30 | 490 | 3.4 | 1.6 | 53 | 850 | 120 | 15 | 190 | <u>460</u> | 600 | Comparative Example |
| 34 | B | 1150 | 930 | 50 | 470 | 3.2 | 1.4 | 56 | 860 | 250 | 25 | 140 | 320 | <u>5</u> | Comparative Example |

*1: The average cooling rate in the range of 700° C. to cooling stop temperature.
*2: The average cooling rate down to the cooling stop temperature after holding in the annealing temperature range.
* Underlined figures are outside the ranges of the disclosed embodiments.

Test pieces were taken from the obtained high-strength cold rolled steel sheets (including galvanized steel sheets, galvannealed steel sheets, and electrogalvanized steel sheets), and structural observation, tensile test, and welding test were performed. The testing methods were as follows.

(1) Structural Observation

First, a test piece for structural observation was taken from an annealed or annealed and coated high-strength cold rolled steel sheet, and polished so as to form an observation surface at a position corresponding to ¼ of the sheet thickness in the rolling-direction section (L section), corroded (with 3 vol. % nital solution), and observed with a scanning electron microscope (SEM) at a 5000× magnification. The obtained SEM image was analyzed to determine the microstructure fractions (area fractions) of the respective phases, and the obtained values were assumed to be the volume fractions. In the image analysis, "Image-Pro" (trade name) produced by Media Cybernetics Inc., was used as the analysis software. In the SEM image, ferrite appears gray, as-quenched martensite, retained austenite, and cementite appear white, and bainite and tempered martensite appear in a color between gray and white. Thus, the respective phases were identified on the basis of the color tone. Furthermore, a microstructure in which fine lines or dots of retained austenite and cementite were observed in ferrite was assumed to be bainite, and a microstructure in which fine lines or dots of cementite were observed in martensite was assumed to be tempered martensite. Moreover, the areas of the ferrite grains and bainite and tempered martensite grains were determined by image analysis using the obtained SEM image, equivalent circle diameters were calculated from the obtained areas, and arithmetic means of these values were assumed to be the average crystal grain diameters.

The portion within the same field of view as the SEM image was observed with SEM-EBSD (electron back-scattering diffraction), and a microstructure identified as the bcc microstructure of Fe from the phase map was assumed to be as-quenched martensite from among the microstructures that appeared white in the SEM image. The area of the as-quenched martensite grains was determined by image analysis using the obtained SEM image and phase map, an equivalent circle diameter was calculated from the obtained area, and an arithmetic mean of these values was assumed to be the average crystal grain diameter.

The average crystal grain diameter of the retained austenite grains was determined by observing the section with a transmission electron microscope (TEM) at a 15000× magnification, determining the area of the retained austenite grains by image analysis of the obtained TEM image, calculating the equivalent circle diameter from the area, and determining the arithmetic mean from these values.

A test piece for X-ray diffraction was taken from an annealed or annealed and coated cold rolled steel sheet, and ground and polished so as to form an observation surface at a position corresponding to ¼ of the sheet thickness. Then the amount of retained austenite was determined from the diffracted X-ray intensities by the X-ray diffractometry. The incident X-ray used was Co K-α line. In calculating the amount of retained austenite, the intensity ratio was calculated for all combinations of the accumulated intensities of the {111}, {200}, {220}, and {311} surfaces of austenite and {110}, {200}, and {211} surfaces of ferrite, and average values were determined, and the amount (volume fraction) of retained austenite in the steel sheet was calculated.

(2) Tensile Test

A JIS No. 5 test piece was taken from an annealed or annealed and coated high-strength cold rolled steel sheet so that the tensile direction was a direction perpendicular to the rolling direction (C direction), and a tensile test was conducted in accordance with the provisions of JIS Z 2241 (2011) to determine the tensile properties (tensile strength TS and breaking elongation El). The uniform elongation uEl was also determined. In the TS: 980 MPa grade, the strength-ductility balance was rated as satisfactory when El: 12.0% or more. It was confirmed that the uniform elongation (uEl) was 9.5% or more in most cases.

The obtained results are indicated in Table 3.

(3) Hole Expanding Test

A 100 mm W×100 mm L test piece was taken from an annealed or annealed and coated high-strength cold rolled steel sheet, and in accordance with the provisions of JIS Z 2256 (2010), a 10 mm φ hole was punched with a clearance of 12±1%, and a 60° conical punch was lifted upward to expand the hole. The lifting of the punch was stopped when a crack penetrated through in the sheet thickness direction, and a hole expansion ratio λ (%) was measured from the hole diameter after penetration of the crack and the hole diameter before testing. In the TS: 980 MPa grade, the hole expandability was rated as satisfactory when λ: 40% or more.

The obtained results are indicated in Table 3.

(4) Welding Test

One 150 mm W×50 mm L test piece taken from an annealed or annealed and coated high-strength cold rolled steel sheet and a 590 MPa grade galvanized steel sheet were used to perform resistance welding (spot welding). A sheet set consisting of two steel sheets stacked on top of each other was subjected to resistance spot welding by using a servo-motor-pressure-type single-phase AC (50 Hz) resistance welding machine attached to a welding gun, while tilting the sheet set by 3°. The welding conditions were a welding pressure of 4.0 kN and a holding time of 0.2 seconds. The welding current and the welding time were adjusted so that the nugget diameter was 4√t mm (t: thickness of high-strength cold rolled steel sheet). After welding, the test piece was cut in half, the section was observed with an optical microscope, and samples in which cracks 0.1 mm or larger were not found were assumed to have satisfactory resistance welding cracking resistance and rated "O", and samples in which cracks of 0.1 mm or larger were found were rated "x".

TABLE 3

| No. | Steel type | Ferrite phrase Volume fraction (%) | Ferrite phrase Average crystal grain diameter (μm) | Retained austenite phase Volume fraction (%) | Retained austenite phase Average crystal grain diameter (μm) | Martensite phase Volume fraction (%) | Martensite phase Average crystal grain diameter (μm) | Martensite phase Average intergranular distance (μm) | Bainite phase and tempered martensite phase Average crystal grain diameter (μm) | Bainite phase and tempered martensite phase Total volume fraction (%) | TS (MPa) | El (%) | uEl (%) | λ (%) | Weld test | Steel sheet type | Remarks |
|---|---|---|---|---|---|---|---|---|---|---|---|---|---|---|---|---|---|
| 1 | A | 24 | 3.7 | 6 | 0.3 | 10 | 1.2 | 2.5 | 3.4 | 52 | 1084 | 15.0 | 11.4 | 63 | ○ | GI | Example |
| 2 | B | 32 | 4.3 | 3 | 0.5 | 6 | 2.1 | 6.0 | 3.2 | 48 | 985 | 16.4 | 12.6 | 50 | ○ | GA | Example |
| 3 | C | 20 | 3.2 | 5 | 0.5 | 9 | 1.5 | 3.3 | 2.9 | 60 | 1022 | 12.8 | 9.5 | 64 | ○ | GA | Example |
| 4 | D | 25 | 3.5 | 5 | 0.8 | 11 | 1.2 | 2.3 | 3.6 | 47 | 996 | 14.8 | 11.4 | 62 | ○ | CR | Example |
| 5 | E | 33 | 4.5 | 8 | 0.7 | 10 | 1.5 | 3.1 | 3.6 | 39 | 1067 | 13.6 | 10.7 | 49 | ○ | CR | Example |
| 6 | F | 30 | 4.1 | 6 | 0.6 | 6 | 0.9 | 2.6 | 3.7 | 58 | 1048 | 13.0 | 9.8 | 46 | ○ | CR | Example |
| 7 | G | 27 | 3.3 | 3 | 0.9 | 10 | 1.5 | 3.1 | 2.9 | 52 | 990 | 14.7 | 11.2 | 48 | ○ | GA | Example |
| 8 | H | 34 | 3.6 | 5 | 0.6 | 9 | 1.2 | 2.6 | 3.1 | 40 | 1023 | 13.8 | 10.8 | 55 | ○ | GI | Example |
| 9 | I | 24 | 2.9 | 2 | 0.2 | 6 | 1.0 | 2.9 | 2.6 | 57 | 1007 | 14.0 | 10.5 | 58 | ○ | GA | Example |
| 10 | J | 30 | 2.9 | 3 | 0.4 | 10 | 0.9 | 1.8 | 2.5 | 45 | 1066 | 12.8 | 10.0 | 50 | ○ | GA | Example |
| 11 | K | 25 | 3.0 | 7 | 0.6 | 8 | 1.1 | 2.6 | 3.4 | 55 | 1034 | 13.3 | 10.0 | 48 | ○ | CR | Example |
| 12 | L | 29 | 3.2 | 2 | 0.4 | 5 | 1.4 | 4.5 | 3.0 | 57 | 987 | 14.8 | 11.9 | 57 | ○ | CR | Example |
| 13 | M | 22 | 3.9 | 3 | 0.5 | 11 | 0.8 | 1.5 | 3.7 | 60 | 1017 | 14.8 | 11.0 | 51 | ○ | EG | Example |
| 14 | N | 34 | 3.0 | <u>0</u> | 0.0 | <u>1</u> | 0.2 | 1.6 | 3.2 | 54 | <u>925</u> | 20.7 | 13.7 | 65 | ○ | GA | Comparative Example |
| 15 | O | 28 | 3.2 | <u>13</u> | 1.3 | <u>14</u> | 1.9 | 3.1 | 2.8 | 35 | 1121 | <u>8.5</u> | 7.2 | <u>24</u> | × | CR | Comparative Example |
| 16 | P | 30 | 2.7 | <u>0</u> | 0.0 | 6 | 0.9 | 2.6 | 3.0 | 56 | 965 | <u>10.2</u> | 6.6 | 46 | ○ | CR | Comparative Example |
| 17 | Q | 32 | 2.9 | 6 | 0.4 | 7 | 0.8 | 2.1 | 3.2 | 47 | 1016 | 13.9 | 10.7 | 42 | ○ | GA | Comparative Example |
| 18 | R | 33 | 3.5 | <u>0</u> | 0.0 | 3 | 0.6 | 2.6 | 3.2 | 52 | 968 | 16.2 | 10.7 | 60 | × | GI | Comparative Example |
| 19 | S | 21 | 3.1 | <u>13</u> | 1.0 | <u>15</u> | 1.5 | 2.3 | 3.3 | 44 | 1108 | <u>7.5</u> | 6.3 | 36 | ○ | GA | Comparative Example |
| 20 | T | 33 | 2.4 | 3 | 0.3 | 10 | 0.7 | 1.4 | 2.6 | 47 | 1087 | <u>6.8</u> | 5.2 | 42 | ○ | CR | Comparative Example |
| 21 | U | 34 | 2.6 | 3 | 0.4 | 9 | 0.7 | 1.5 | 2.3 | 50 | 1065 | <u>7.4</u> | 5.7 | 44 | × | CR | Comparative Example |
| 22 | V | 26 | 3.0 | 4 | 0.5 | <u>16</u> | 1.3 | 1.9 | 3.1 | 46 | 1052 | <u>7.0</u> | 5.0 | <u>26</u> | ○ | CR | Comparative Example |
| 23 | A | 30 | <u>5.3</u> | 3 | 0.3 | <u>10</u> | 0.4 | <u>0.8</u> | 3.8 | 52 | 992 | 13.5 | 10.3 | <u>35</u> | ○ | GI | Comparative Example |
| 24 | A | 18 | <u>2.3</u> | 2 | 0.2 | 8 | 0.3 | <u>0.7</u> | 1.6 | 60 | 1012 | <u>9.8</u> | 7.3 | <u>38</u> | ○ | CR | Comparative Example |
| 25 | A | 24 | <u>5.7</u> | 3 | 0.4 | 8 | <u>3.2</u> | <u>7.6</u> | <u>4.6</u> | 58 | 1005 | 12.8 | 9.6 | <u>32</u> | ○ | CR | Comparative Example |
| 26 | A | <u>43</u> | <u>4.2</u> | 3 | 0.4 | 6 | 1.0 | 2.9 | <u>3.8</u> | 32 | 994 | 17.2 | 13.6 | <u>27</u> | ○ | GA | Comparative Example |
| 27 | A | <u>18</u> | <u>5.4</u> | 3 | 0.4 | 6 | 0.9 | 2.6 | <u>4.9</u> | 64 | 1087 | <u>8.7</u> | 6.4 | <u>22</u> | ○ | GA | Comparative Example |
| 28 | B | <u>45</u> | 3.4 | 3 | 0.6 | 11 | 0.8 | 1.5 | 2.9 | 29 | 1008 | 15.2 | 12.2 | <u>25</u> | ○ | GA | Comparative Example |
| 29 | B | <u>42</u> | 4.2 | 2 | 0.4 | 3 | 1.1 | 4.8 | 3.5 | <u>20</u> | 995 | <u>11.4</u> | 8.6 | <u>26</u> | ○ | GA | Comparative Example |
| 30 | A | <u>22</u> | 3.4 | 4 | 0.5 | 2 | 0.6 | 3.3 | 3.0 | <u>72</u> | 1054 | <u>9.0</u> | 6.6 | 46 | ○ | GI | Comparative Example |
| 31 | A | 30 | 3.2 | 4 | 0.3 | <u>20</u> | 0.7 | <u>0.8</u> | 2.7 | 32 | 1065 | 12.1 | 9.1 | <u>24</u> | ○ | CR | Comparative Example |
| 32 | A | 32 | 3.1 | 2 | 0.2 | <u>30</u> | 1.0 | <u>0.8</u> | 2.5 | 28 | 1083 | <u>8.6</u> | 6.5 | <u>31</u> | ○ | CR | Comparative Example |
| 33 | A | 30 | 2.9 | 6 | 0.2 | <u>1</u> | 0.4 | 3.3 | 2.2 | 60 | <u>920</u> | 17.5 | 13.0 | 64 | ○ | CR | Comparative Example |
| 34 | B | 29 | 3.0 | 2 | 0.3 | <u>24</u> | 0.9 | <u>0.9</u> | 2.6 | 33 | 1079 | <u>11.4</u> | 8.6 | <u>24</u> | ○ | GA | Comparative Example |

*Underlined figures are outside the ranges of the disclosed embodiments.
*CR: cold rolled steel sheet, GI: galvanized steel sheet, GA: galannealed steel sheet; EG: electrogalvanized steel sheet Examples of the disclosed embodiments, Nos. 1 to 13, all had a microstructure containing particular fractions of ferrite, retained austenite, martensite, bainite, and tempered martensite, and these high-strength cold rolled steel sheets all had a high strength, namely, tensile strength TS: 980 MPa or more, high ductility, namely, total elongation El: 12% or more, high hole expandability, namely, a hole expansion ratio λ of 40% or more, and excellent resistance spot weldability.

In contrast, in Nos. 15, 17, and 19, cracks occurred during welding due to incorporation of excessive C, Si, and Mn, and, in Nos. 15 and 19, the desired microstructure was not obtained, and El and λ were deficient.

In Nos. 14, 16, 18, and 20 to 22, at least one of TS, El, and λ was poor since the composition of the components in the steel was outside the limited ranges.

In Nos. 23 to 34, the composition of the components in the steel was within the limited ranges, but the production method was outside the scope of the disclosed embodiments. Thus, in the final steel sheet microstructure, a microstructure containing appropriate forms of a ferrite phase, a retained austenite phase, a martensite phase, a bainite phase, and a tempered martensite phase was not obtained, and at least one property selected from TS, El, and λ was poor.

As described above, the examples of the disclosed embodiments provide high-strength cold rolled steel sheets having high strength, high ductility, high hole expandability, and excellent weldability.

The invention claimed is:

1. A cold rolled steel sheet having a chemical composition comprising, by mass %:
   C: 0.04% or more and 0.12% or less,
   Si: 0.15% or more and 0.56% or less,
   Mn: 2.00% or more and 3.50% or less,
   P: 0.050% or less,
   S: 0.0050% or less,
   N: 0.0100% or less,
   Al: 0.010% or more and 0.051% or less,
   Ti: 0.005% or more and 0.075% or less,
   Nb: 0.005% or more and 0.075% or less,
   B: 0.0002% or more and 0.0040% or less, and
   the balance being Fe and unavoidable impurities,
   wherein a total content of Al and Si is 0.16% or more and 0.579% or less,
   the steel sheet including a steel microstructure comprising, by volume fraction, 35% or less of ferrite, in a range of 1% or more and 10% or less of retained austenite, in a range of 2% or more and 12% or less of as-quenched martensite, and a total in a range of 25% to 70% of bainite and tempered martensite,
   wherein the steel microstructure has an average crystal grain diameter of the ferrite: 5.0 μm or less, an average crystal grain diameter of the retained austenite: 2.0 μm or less, an average crystal grain diameter of the as-quenched martensite: 3.0 μm or less, an average crystal grain diameter of the bainite and the tempered martensite phase: 4.0 μm or less, and an average intergrain distance of the as-quenched martensite of 1.0 μm or more.

2. The cold rolled steel sheet according to claim 1, wherein the chemical composition further comprises, by mass %, at least one selected from the group consisting of:
   V: 0.005% or more and 0.200% or less,
   Cr: 0.05% or more and 0.20% or less,
   Mo: 0.01% or more and 0.20% or less,
   Cu: 0.05% or more and 0.20% or less,
   Ni: 0.01% or more and 0.20% or less,
   Sb: 0.002% or more and 0.100% or less,
   Sn: 0.002% or more and 0.100% or less,
   Ca: 0.0005% or more and 0.0050% or less,
   Mg: 0.0005% or more and 0.0050% or less, and
   REM: 0.0005% or more and 0.0050% or less.

3. The cold rolled steel sheet according to claim 1, wherein one of a galvanizing layer, a galvannealing layer, and an electrogalvanizing layer is disposed on a surface of the steel sheet.

4. A method for producing a cold rolled steel sheet, the method comprising:
   hot-rolling a steel slab having the chemical composition according to claim 1 at a hot rolling start temperature in a range of 1100° C. or higher and 1300° C. or lower and a finish rolling temperature in a range of 800° C. or higher and 1000° C. or lower to obtain a hot-rolled steel sheet, and, after the hot rolling, cooling the hot rolled steel sheet to a cooling stop temperature of 500° C. or lower at an average cooling rate in a range of 5° C./s or more and 50° C./s or less in a temperature range of from 700° C. to the cooling stop temperature, and then coiling the cooled sheet;
   performing a pickling treatment on the hot rolled steel sheet obtained in the hot rolling process;
   cold-rolling the hot rolled steel sheet, which has been pickled in the pickling process, at a reduction ratio in a range of 30% or more and 70% or less; and
   annealing by holding the cold rolled steel sheet obtained in the cold rolling process at a temperature in a range of 750° C. or higher and 900° C. or lower for a duration in a range of 10 seconds or more and 900 seconds or less, and, after holding the sheet, cooling the cold rolled steel sheet to a cooling stop temperature in a range of 100° C. or higher and 250° C. or lower at an average cooling rate of 5° C./s or more, then heating the cooled sheet to a reheating temperature in a range of 300° C. or higher and 400° C. or lower, and holding the heated sheet in the re-heating temperature range for a duration in a range of 10 seconds or more and 1800 seconds or less, thereby forming the cold rolled steel sheet according to claim 1.

5. The method for producing a cold rolled steel sheet according to claim 4, the method further comprising, after the annealing process, performing a coating process to form one of a galvanizing layer, a galvannealing layer, and an electrogalvanizing layer on the steel sheet.

6. The cold rolled steel sheet according to claim 2, wherein one of a galvanizing layer, a galvannealing layer, and an electrogalvanizing layer is disposed on a surface of the steel sheet.

7. A method for producing a cold rolled steel sheet, the method comprising:
   hot-rolling a steel slab having the chemical composition according to claim 2 at a hot rolling start temperature in a range of 1100° C. or higher and 1300° C. or lower and a finish rolling temperature in a range of 800° C. or higher and 1000° C. or lower to obtain a hot-rolled steel sheet, and, after the hot rolling, cooling the hot rolled steel sheet to a cooling stop temperature of 500° C. or lower at an average cooling rate in a range of 5° C./s or more and 50° C./s or less in a temperature range of from 700° C. to the cooling stop temperature, and then coiling the cooled sheet;
   performing a pickling treatment on the hot rolled steel sheet obtained in the hot rolling process;

cold-rolling the hot rolled steel sheet, which has been pickled in the pickling process, at a reduction ratio in a range of 30% or more and 70% or less; and annealing by holding the cold rolled steel sheet obtained in the cold rolling process at a temperature in a range of 750° C. or higher and 900° C. or lower for a duration in a range of 10 seconds or more and 900 seconds or less, and, after holding the sheet, cooling the cold rolled steel sheet to a cooling stop temperature in a range of 100° C. or higher and 250° C. or lower at an average cooling rate of 5° C./s or more, then heating the cooled sheet to a reheating temperature in a range of 300° C. or higher and 400° C. or lower, and holding the heated sheet in the re-heating temperature range for a duration in a range of 10 seconds or more and 1800 seconds or less, thereby forming the cold rolled steel sheet according to claim 2.

8. The method for producing a cold rolled steel sheet according to claim 7, the method further comprising, after the annealing process, performing a coating process to form one of a galvanizing layer, a galvannealing layer, and an electrogalvanizing layer on the steel sheet.

\* \* \* \* \*